United States Patent
Blume

(10) Patent No.: US 7,308,708 B2
(45) Date of Patent: Dec. 11, 2007

(54) ALTERNATE ENCODINGS OF A BIOMETRIC IDENTIFIER

(75) Inventor: Leo Robert Blume, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 858 days.

(21) Appl. No.: 10/210,912

(22) Filed: Aug. 2, 2002

(65) Prior Publication Data
US 2004/0025046 A1    Feb. 5, 2004

(51) Int. Cl.
*H04L 9/32*    (2006.01)

(52) U.S. Cl. ......................... 726/5; 713/186; 713/184; 726/2

(58) Field of Classification Search .............. 726/2, 726/5; 713/186
See application file for complete search history.

(56) References Cited

U.S. PATENT DOCUMENTS

| | | | | |
|---|---|---|---|---|
| 5,966,691 | A * | 10/1999 | Kibre et al. | 704/260 |
| 6,092,192 | A * | 7/2000 | Kanevsky et al. | 713/186 |
| 6,151,676 | A * | 11/2000 | Cuccia et al. | 713/176 |
| 6,363,485 | B1 * | 3/2002 | Adams et al. | 713/186 |
| 6,532,481 | B1 * | 3/2003 | Fassett, Jr. | 707/203 |
| 6,580,814 | B1 * | 6/2003 | Ittycheriah et al. | 382/115 |
| 6,718,471 | B1 * | 4/2004 | Kashima | 726/9 |
| 6,765,470 | B2 * | 7/2004 | Shinzaki | 340/5.52 |
| 6,782,120 | B2 * | 8/2004 | Modl et al. | 382/124 |
| 6,836,556 | B1 * | 12/2004 | Bromba et al. | 382/124 |
| 6,970,853 | B2 * | 11/2005 | Schutzer | 705/67 |
| 2001/0017584 | A1 * | 8/2001 | Shinzaki | 340/5.52 |
| 2001/0039619 | A1 * | 11/2001 | Lapere et al. | 713/186 |
| 2002/0029341 | A1 * | 3/2002 | Juels et al. | 713/184 |
| 2003/0091218 | A1 * | 5/2003 | Hamid | 382/124 |
| 2004/0148509 | A1 * | 7/2004 | Wu | 713/186 |
| 2005/0090229 | A1 * | 4/2005 | Tatsuki et al. | 455/406 |
| 2005/0144484 | A1 * | 6/2005 | Wakayama | 713/202 |
| 2005/0235148 | A1 * | 10/2005 | Scheidt et al. | 713/168 |

OTHER PUBLICATIONS

Goldberg et al., Doodling our way to better authentication, . In CHI '02 Extended Abstracts on Human Factors in Computing Systems (Minneapolis, Minnesota, USA, Apr. 20-25, 2002). ACM Press, New York, NY, 868-869.*

* cited by examiner

*Primary Examiner*—Nasser Moazzami
*Assistant Examiner*—David Garcia Cervetti

(57) ABSTRACT

Techniques for extending access to biometric authentication systems to locations not necessarily equipped with a biometric scanner are disclosed. For example, an improved biometric authentication system may also accept a user-inputted pass code derived from, and serving as a proxy for, the user's biometric identifier. The pass code is constructed to be of a form that is meaningful to the user, so that it is readily memorizable. Exemplary forms of pass codes can include one or more words of text, color sequences, and more.

44 Claims, No Drawings

ALTERNATE ENCODINGS OF A BIOMETRIC IDENTIFIER

FIELD

This patent application pertains generally to the field of encryption, and more specifically, to alternate encodings of biometric identifiers.

BACKGROUND

Biometric authentication is generally regarded as being more secure, and also more user-friendly, than conventional forms of authentication. Examples of biometric authentication include the use of fingerprints, voice patterns, retinal patterns, and/or other physiological characteristics of a user to uniquely identify that user.

Typically, when the user wishes to access a protected application (e.g., secure building, secure area within a building, secure computer, secure software application, etc.), the user is asked to provide a substantially real-time sample of the biometric characteristic. For example, he might place his finger in a fingerprint scanner, speak a voice sample into a microphone, peer into a retinal scanner, etc. The biometric characteristic is captured electronically (typically digitally), and compared to a stored sample. If the captured data match the stored data (to a required degree of accuracy), the user is granted access.

Biometric authentication relies on the user's identifier or other access indicia being "something the user is." Such an access indicia is not readily stolen or reproduced. In contrast, nonbiometric authentication relies on the user's access indicia being "something the user has" (e.g., a password, a private key, etc.), which is much easier to steal or reproduce. Therefore, all other factors being equal, biometric authentication is usually more secure than nonbiometric authentication.

However, biometric authentication is not infrastructure-friendly, because of the relative scarcity of biometric scanners for acquiring a biometric characteristic to serve as, or for conversion to, the user's biometric identifier. This scarcity, in turn, reflects the fact that biometric data acquisition is much more expensive than conventional authentication. For example, a fingerprint- or retinal-based biometric scanner requires optics (to visualize the biometric data), image acquisition hardware/software (to capture the data), digital processing software (to transform the data to a standard format at an acceptable quality level), and a sufficiently high bandwidth connection to a computer (to transmit the data for authentication). In contrast, in a nonbiometric authentication scheme, a simple pop-up field in a web browser is sufficient to capture the password or other alphanumeric access indicia.

The expense and complexity of biometric scanners is a significant reason why biometric authentication, to date, has not been widely deployed in, say, home environments. As a corollary, users of a system requiring biometric authentication typically cannot access the system from locations other than those having a biometric scanner.

Thus, it would be desirable to allow access to systems requiring biometric authentication from locations not necessarily equipped with a biometric scanner. For example, if a biometric authentication system could also accept a user-inputted pass code derived from and serving as a proxy for a biometric identifier, then the benefits of biometric authentication could be extended to locations lacking biometric scanners.

SUMMARY

Various techniques for authenticating a user having a biometric identifier without necessarily requiring the user to present the biometric identifier are disclosed herein. During pass code generation, the user's biometric identifier is converted into a pass code: (a) derived from the biometric identifier; (b) from which it is relatively infeasible to rederive said biometric identifier; and (c) being of a form readily memorizable by, or otherwise meaningful to, the user. During authentication, an authentication system receives a candidate pass code purportedly presented on behalf of the user. The system tests the candidate pass code against a stored representation of the user's biometric identifier, and verifies the user's identity if testing is successful. Some exemplary embodiments might include text-based, color-based and/or yet other forms of pass codes.

DETAILED DESCRIPTION

Section I describes exemplary biometric data with which the technologies described in this patent application can be used. Section II describes some exemplary textual pass codes which are readily created from common forms of biometric identifiers, and the use of a textual pass code as a proxy for the biometric identifier. Section III describes some exemplary color-based pass codes as possible alternatives to the textual pass code.

I. Exemplary Biometric Data

Biometric characteristics of a user suitable for authentication applications include a retinal pattern, a fingerprint, a handwriting sample, a speech sample, and virtually any other sample inherent to the user. In a biometric authentication system, the biometric characteristic would be stored as a biometric identifier. The biometric identifier may comprise the biometric characteristic in the form in which it is acquired, or the biometric characteristic may be processed in some manner to form the biometric identifier. For example and without limitation, the processing might include sampling, grayscaling, encoding, compression, or still other forms of processing. These are well known to those skilled in the art, and need not be described in detail here. All of the foregoing are suitable for use with the pass codes that will be described below, the only requirement of the biometric identifier being that it can be represented in digital form. The digital form could be a string, a picture, or any other known file format, any of which could take the form of ASCII data or binary data.

II. Exemplary Textual Pass Codes

The aforementioned biometric identifier is used to derive a pass code which can be inputted by a user into a biometric authentication system equipped to accept the pass code. The pass code may be thought of as a proxy (or substitute, or alternate encoding) for the biometric identifier.

When a party enters a candidate pass code, purportedly on behalf of a particular user, the candidate pass code is tested against a stored representation of the user's biometric identifier. If testing is successful, the user's identity is verified.

A. Textual Pass Code Generation

Preferably, the pass code should be readily memorizable (or otherwise meaningful) so that the user is less likely to compromise security by writing down (or otherwise recording) the pass code.

In one exemplary embodiment, a pass code may be created as follows. The user's biometric identifier is converted to alphanumeric form if necessary (i.e., if not already provided in that form by the biometric scanner) in accordance with any known protocol. For example, BinHex or UUENCODE are conversion protocols in common use. Once in alphanumeric form, the biometric identifier is parsed and processed to yield a pass code in a form which is meaningful to a human user. The form of parsing and processing are selected in accordance with the desired form of the pass code.

1. Single Word Pass Code

For example, one exemplary pass code takes the form of a string of characters. In that case, an exemplary pass code generator could simply select the desired sequence of characters from the alphanumeric representation of the biometric identifier. For example, the generator could: (a) select the first N characters; (b) select every Mth character until the desired number of characters is selected; (c) select capital letters; (d) select lowercase letters; or (e) follow still other protocols for selecting the desired characters from the alphanumeric representation of the biometric identifier.

The pass code thus produced is a simple string of characters. Because it holds less information than the biometric identifier from which the pass code was generated, one cannot readily (re-)derive the biometric identifier from the pass code. That is, pass code generation is a "one way" process. This is similar in many respects to a hash function, which is a well-known technique for storing reference data and testing such reference data against candidate data inputted by (or on behalf of) users. Indeed, many well-known hash functions (e.g., which generate simple alphanumeric strings as their outputs) could also be used for pass code generation.

Because such simple strings are likely to appear random, or at least highly irregular in form, many users will likely find them difficult to memorize, and may therefore resort to writing them down or otherwise compromising the security of the system.

Thus, in this exemplary embodiment, it is also desirable to make the pass code meaningful to a user. For example, the simple string could be (partially or wholly) stripped of punctuation, numbers, and other special characters which are difficult to remember, thereby converting the pass code to textual form.

If the textual string is still not sufficiently meaningful, it can be passed through an electronic spell checker (or other form of electronic word generator) to yield one or more words in any given language. Words, of course, are significantly more meaningful than an arbitrary sequence of letters and/or numbers. The spell checker (or dictionary) will interpret an arbitrary input string as a misspelling, and suggest one or more possible words as possible intended spellings.

If multiple words are returned, one of the words can be selected as the desired pass code. The word could be selected according to any desired criteria, for example, its position in the list of returned words, a desired length, a desired word type (e.g., noun, verb, etc.), and so forth.

If no words are returned, another portion of the alphanumeric representation of the biometric identifier can be used to produce an input to the spell checker until a meaningful word is produced.

Indeed, if a spell checker is used, the step of stripping out punctuation, numbers, and other special characters need not necessarily be separately performed, since many spell checkers will inherently perform such stripping.

2. Multiple Word Pass Code

The foregoing example can readily be extended or repeated to produce a sequence of words.

For example, if the spell checker operating on a single portion of the biometric identifier yields multiple words, some or all of those words could be used to form a pass code in the form of a multiple word sequence.

Or, if only one word is outputted, it could still be converted to a multiple word sequence by passing it through another form of electronic word generator (for example, a thesaurus) to generate synonyms, homonyms, and/or antonyms.

Or, different portions of the alphanumeric representation of the biometric identifier could be passed through the spell checker to produce different words. That is, the biometric identifier could be parsed into discrete groups of characters, with each group being passed through the spell checker to yield a set of (i.e., one or more) candidate words. One (or even more) words could then be selected from each set.

3. Sentence Pass Code

If desired, the selection or sequence of words produced by the word generator(s) can be made still more meaningful by requiring that the words have desired grammatical (or syntactical) characteristics. For example, it could be required that the first word be a noun, the second word a verb, and the third word an object, thereby forming a sentence. If more meaningful sentences are desired, one could add articles, adjectives, adverbs, etc. until the sentence exhibits a desired degree of complexity or sophistication.

4. Example

As merely one example of the foregoing, we demonstrate how a biometric identifier can be converted to a multiple word pass code.

In this example, let the biometric identifier originate as binary data, and be converted to ASCII data via application of the BINHEX protocol. For the sake of illustration, let an exemplary ASCII output be the string ":$f*TEQKPH#jdCA0d,R0TG!"6594%8dP8) 3#3"!&m!*!%EMa6593K!!%!!!&mFNa."

After removing punctuation, numbers and special symbols, we are left with "fTEQKPHjdCAdRTGdPmEMaKmFNa."

Next, we take the letters in groups (i.e., strings) and submit them to a dictionary to yield meaningful words. Dictionaries usable for this purpose are well known to those skilled in the art, and need not be described in detail here. For the sake of illustration, we shall use the Microsoft Encarta dictionary (publicly available on the web at www.encarta.msn.com/reference). Of course, other dictionaries, including those available in word processors, and other environments, may also be used.

In general, the parsing of the biometric identifier will be a matter of design choice appropriate for a particular system configuration.

For the sake of illustration, we will parse the biometric identifier four letters at a time, which is somewhat arbitrary, although it does have some convenient properties in connection with the aforementioned exemplary dictionary. In particular, experimentation using this particular dictionary shows that using four (or so) letters tends to: (a) return a plurality of possible intended words; and (b) suggest relatively short words (that are easier to type). In contrast, if we were to use groups of 16 random letters, the exemplary dictionary often does not return any words. Conversely, if we were to use groups of 2 letters, the word choice would be too limited.

Using four letters as a time, we parse the alphanumeric representation of the biometric identifier into:
fTEQ
KPHj
dCAd
RTGd
PmEM
aKmF
Na.

Submitting the first string, fTEQ, to the dictionary yields the following set of suggested words:
freq.
feta
fate
fete
fête
fit
fates
fetes
fêtes
few.

There are many possible algorithms for word selection at this point. For the sake of illustration, we will simply take the first word not containing punctuation or special symbols, namely, feta.

If we only desire a one word pass code, we can stop here. Otherwise, we can repeat the foregoing process with the remaining alphanumeric strings to yield other words.

Thus, submitting the second string, KPHj, to the dictionary yields:
kHz
kohl
phi
pHs
kopje
chi
Kuhn
Kahn which, using the same selection algorithm as before, gives kHz.

Similarly, submitting the third string, dCAd to the dictionary yields
dad
dead
dyad
cad
decade
diced
dace
dads
dada which, using the same selection algorithm as before, gives dad.

The words selected from the first three strings thus comprise a pass code of "feta khz dad." Obviously, more or less strings (and one or more words from each string) could be used, as desired for any particular implementation.

It happens in this example that we can't work backwards from the pass code ("feta khz dad") to the corresponding strings of the biometric identifier ("FTEQ KPHj dCAd"), much less to the entire biometric identifier. For example, both "ftea" and "FTEQ" (and many other strings are equally plausible first string candidates, in that they yield the same first word in the pass code ("feta"). So, working backwards from feta, we can never know the original first string.

This is beneficial for security purposes. Were this not so, any pass code could be used to rederive the biometric identifier. If that were the case, if a pass code were lost or stolen, it could not securely be replaced with another pass code (i.e., one derived using a different pass code generation algorithm) because anyone obtaining the lost password and having access to the new algorithm could readily rederive the new pass code.

B. Pass Code Verification

Once the pass code is generated, it can be given to the user, who can subsequently present it to the system as a substitute for his biometric identifier.

In order for the system to be able to test and verify the pass code as being correct, the system stores a representation of the corresponding biometric identifier (i.e., the identifier from which the pass code was derived).

The representation can take any of multiple possible forms, including: (1) the biometric identifier itself; (2) the pass code itself; (3) a function of the biometric identifier; and/or (4) combinations of the foregoing.

1. Stored Biometric Identifier

In one exemplary embodiment, the representation of the biometric identifier is the biometric identifier itself. When presented with a candidate pass code, the system identifies the user on behalf of which the candidate pass code is presented, and regenerates the user's pass code using the same algorithm as was previously used (see Section I above). The system then compares the regenerated pass code to the candidate pass code. If they match, the user's identity is verified.

2. Stored Pass Code

In another exemplary embodiment, the representation of the biometric identifier is the pass code itself. When presented with a candidate pass code, the system identifies the user on behalf of which the candidate pass code is presented, obtains the user's pass code from memory, and compares the user's pass code to the candidate pass code. If they match, the user's identity is verified.

3. Other Stored Representations of the Biometric Identifier

More generally, the representation of the biometric identifier can include any quantity that can be transformed into the pass code, or into which the pass code can be transformed. This is actually a generalization of the preceding exemplary embodiments, where the representation of the biometric identifier was the biometric identifier or the pass code. Even more generally, the representation of the biometric identifier can include any quantity which can otherwise be related to the pass code via a known function.

The system also stores, or otherwise has access to, a conversion algorithm relating the stored representation of the biometric identifier to either the biometric identifier or the pass code.

When presented with a candidate pass code, the system identifies the user on behalf of which the candidate pass code is presented, obtains the stored representation of the user's biometric identifier from memory, and uses the conversion algorithm to generate a basis for comparison.

The conversion algorithm could operate on the stored quantity (i.e., the representation of the biometric identifier). As just one example of the foregoing, the stored representation of the biometric identifier could be a preliminary output of the dictionary (e.g., a list of possible words corresponding to the inputted string). The corresponding conversion algorithm would be the protocol by which one or more of such words was selected to form the pass code (see Section I above). In this example, the dictionary function and the algorithm would each constitute a portion of the overall pass code generation process, and together operate to reproduce the overall pass code generation process.

More generally, the stored representation of the biometric identifier could include any precursor of the pass code.

Alternatively, the conversion algorithm could operate on the inputted quantity (i.e., the candidate pass code). As just one example of the foregoing, the stored representation of the biometric identifier could be a hash of the pass code. The corresponding conversion algorithm would be the hash function that was used in hashing the pass code. During testing and verification, the conversion algorithm (e.g., the hash function) would be applied to the candidate pass code, and the result compared with the stored representation of the biometric identifier (e.g., the hash of the pass code). If the hashes match, the user's identity is verified.

As another example, the stored representation of the biometric identifier could be an encrypted version of the pass code. The corresponding conversion algorithm would be the decryption algorithm needed to restore the pass code.

The foregoing are but a few examples of using functions of the biometric identifier (including functions of the pass code) as the basis for testing a candidate pass code and verifying the user's identity. Many other functions of the biometric identifier will be known to those skilled in the art of cryptography, and need not be described in detail here.

4. Combinations of the Foregoing

Of course, it should also be understood that the foregoing examples are not mutually exclusive, but can be used either singly or in combination. For example, rather than storing just the pass code, both the pass code and the biometric identifier could be stored as recognizable forms of access indicia. This would allow the system to efficiently respond to either an inputted pass code, or a biometric identifier, by comparing the user's input with whichever stored access indicia having the same form. Still other combinations will be well known to those skilled in the art, and need not be described in detail here.

III. Exemplary Color Pass Codes

As described above, the exemplary pass code is textual in form. However, many other alternative forms are also possible. For example, some users might find it more convenient to remember colors than words. We describe below an exemplary technique for using a sequence of colors as a pass code substituting for a biometric identifier.

A. Color Pass Code Generation

In this exemplary embodiment, we operate on a numerical, rather than an alphabetical, form of the biometric identifier. The numerical form could come directly from a binary format in which the biometric identifier is acquired, or it could be derived from the alphanumeric form by replacing letters with correspond numbers (e.g., a=1, b=2, . . . , z=26), or it could be derived using virtually any other protocol.

Once the biometric identifier is in numerical form, we parse it into groups of numbers which are then processed to yield colors. One exemplary processing technique is as follows.

For the sake of illustration, let the biometric identifier take the (binary) form of a sequence of bits. We parse the sequence of bits into groups of 24 bits at a time. We treat each group of 24 as three 8-bit subgroups. Since colors can be generally represented as a linear combination of three basis values in a color space, we can use each 8-bit subgroup to represent the strength (e.g., from 0% to 100%) of a different basis value in that color space.

1. RGB Color Space

For example, consider a red-green-blue. (RGB) color space, with the basis values (or basis colors) being red, green and blue. In this color space, any particular color can be represented a triad of 8-bit values representing a linear combination of the basis colors. Since $2^8=256$, each value can take values ranging from 0 to 255. This is a common practice, for example, in digital video. Some exemplary reference colors represented in this fashion might include:

Black=(0, 0, 0)
Red=(255, 0, 0)
Green=(0, 255, 0)
Yellow=(255, 255, 0)
Blue=(0, 0, 255)
Magenta=(255, 0, 255)
Cyan=(0, 255, 255)
White=(255, 255, 255).

The foregoing exemplary reference colors are all extremal values; thus these are often referred to as primary reference colors. Still other reference colors can be specified by intermediate values. As a simple example, orange is chromatically between red and yellow on the color spectrum. Therefore, orange is represented by averaging red (255,0,0) and yellow (255,255,0) to give (255,127,0). Corresponding triads for still other non-primary reference colors are well known to those skilled in the art, and need not be described in detail here.

The system can be configured to work with a spectrum comprising any desired number of reference colors, each reference color being defined by a unique known triad. Then, during processing to generate a pass code, each triad (x, y, z) derived from the biometric identifier can be assigned to its nearest corresponding reference color in the spectrum, as determined using a simple Euclidean measure. This will yield a sequence of colors to be remembered by the user. As with the textual embodiment, the length of the sequence is selectable according to the needs of a particular implementation, with shorter sequences favoring memorizability, and longer sequences favoring greater security.

To illustrate the foregoing, consider a biometric identifier which is converted to numerical form and parsed to give "255 10 14 30 190 0 2 230 40 212 120 15 . . . ," which would be interpreted as (255, 10, 14), (30, 190, 0), (2, 230, 40), (212, 120, 15). Using a spectrum comprising the reference colors mentioned above, this translates into a pass code of RED GREEN GREEN ORANGE.

2. Other Color Spaces

Of course, the use of a RGB color space is merely exemplary, and other alternative color spaces (or basis values) could also be used. For example, the so-called Hue-Saturation-Value or HSV color space is a popular alternative to RGB in which hue, saturation and intensity correspond to the basis colors. Still other color spaces are well known to those skilled in the art of digital video, and need not be described in detail here.

B. Pass Code Verification

Once the pass code is generated, it can be given to the user, who can subsequently present it to the system as a substitute for his biometric identifier.

In order for the system to be able to test and verify the pass code as being correct, the system stores a representation of the corresponding biometric identifier (i.e., the identifier from which the pass code is derived).

The representation can take any of multiple possible forms, including: (1) the biometric identifier itself; (2) the pass code itself; or (3) a function of the biometric identifier; or (4) a function of the pass code.

The techniques for pass code verification using color-based pass codes are analogous to those described above with respect to text, and need not be described in greater detail here.

IV. Operating Environment

The embodiments described herein may be implemented in an operating environment comprising software installed on a computer, in hardware, or in a combination of software and hardware.

The software and/or hardware would typically include some type of computer-readable media which can store data and logic instructions (such as those which, when executed, authenticates a user having a biometric authentication datum using a pass code) that are accessible by the computer or the processing logic within the hardware. Such media might include, without limitation, hard disks, floppy disks, magnetic cassettes, flash memory cards, digital video disks, Bernoulli cartridges, random access memories (RAMs), read only memories (ROMs), and the like.

V. Conclusion

The foregoing illustrates certain exemplary embodiments from which other embodiments, variations, and modifications will be apparent to those skilled in the art. Therefore, the inventions should therefore not be limited to the particular embodiments discussed above, but rather are defined by the claims.

What is claimed is:

1. A method for authenticating a user having a biometric authentication datum using a pass code serving as a substitute therefor, comprising:
   (a) receiving, at an authentication system, a candidate pass code (a1) presented on behalf of a user and (a2) purportedly corresponding to a pass code of said user;
      (i) said user's pass code being a substitute for a corresponding biometric identifier of said user;
      (ii) said user's pass code having been derived from said corresponding biometric identifier; and
      (iii) it being infeasible to rederive said biometric identifier from said user's pass code;
   (b) retrieving, from a memory accessible by said authentication system, a stored representation of said user's biometric identifier;
   (c) testing said candidate pass code against said representation of said user's biometric identifier; and
   (d) verifying said user's identity if said testing is successful.

2. The method of claim 1, where said candidate pass code includes a textual sequence.

3. The method of claim 1, where said candidate pass code includes a color sequence.

4. The method of claim 1 where said stored representation of said user's biometric identifier includes said user's pass code.

5. The method of claim 4 where said (d) includes verifying that said candidate pass code matches said user's pass code.

6. The method of claim 1 where said user's pass code was previously derived from said user's biometric identifier by:
   (x) representing said user's biometric identifier into one or more groups of characters; and
   (y) converting at least one of said groups into corresponding words in a human language.

7. The method of claim 6:
   (1) where said user's biometric identifier originated in binary form; and
   (2) further comprising, before said (x), converting said binary form into American Standard Code for Information Interchange form.

8. The method of claim 6 where said (y) includes:
   (i) operating on least one of said groups with an electronic word generator; and
   (ii) selecting a word returned from said word generator.

9. The method of claim 8 where said word generator is a spell checker.

10. The method of claim 6 where at least some of said words are related to each other in a meaningful way.

11. The method of claim 10 where said meaningful way includes a grammatical relationship.

12. The method of claim 8 where:
   (A) too few words are returned from said word generator; and
   (B) further comprising
      (1) repeating said (x) to obtain a group of larger size, and
      (2) repeating said (i) and (ii) on the result of said (B).

13. The method of claim 6 where said (y) includes removing non-alphabetical characters, if any, from said groups.

14. The method of claim 1 where:
   (i) said stored representation of said user's biometric identifier includes a quantity from which said pass code can be derived;
   (ii) said quantity being convertible to a pass code for said user via a conversion algorithm; and
   (iii) said (d) includes:
      (A) rederiving said user's pass code from said quantity using said conversion algorithm; and
      (B) verifying that said candidate pass code matches said user's pass code.

15. The method of claim 1 where:
   (i) said stored representation of said user's biometric identifier includes a quantity into which said user's pass code can be converted;
   (ii) said user's pass code being convertible to said quantity via a conversion algorithm; and
   (iii) said (d) includes:
      (A) deriving said quantity from said candidate pass code using said conversion algorithm; and
      (B) verifying that said derived quantity matches said stored quantity.

16. The method of claim 1 where said user's pass code was previously derived from said user's biometric identifier user by:
   (x) converting said user's biometric identifier into one or more groups of numbers; and
   (y) interpreting at least some of said groups into colors.

17. The method of claim 16 where:
   (i) said groups include trios of numbers; and
   (ii) said (y) includes interpreting said trios as colors according to a predetermined color scheme.

18. The method of claim 17 where said (ii) includes, for each interpreted trio, determining a reference color closest thereto.

19. The method of claim 17 where said predetermined color scheme includes a Red-Green-Blue color space.

20. A computer-readable medium including logic instructions for authenticating a user having a biometric authentication datum using a pass code serving as a substitute therefor, said logic instructions that, if executed:
 (a) obtain, at an authentication system, a candidate pass code (a1) presented on behalf of a user and (a2) purportedly corresponding to a pass code of said user;
  (i) said user's pass code being a substitute for a corresponding biometric identifier of said user;
  (ii) said user's pass code having been derived from said corresponding biometric identifier; and
  (iii) it being infeasible to rederive said biometric identifier from said user's pass code;
 (b) obtain, from a memory accessible by said authentication system, a stored representation of said user's biometric identifier;
 (c) test said candidate pass code against said representation of said user's biometric identifier; and
 (d) verify said user's identity if said testing is successful.

21. The computer-readable medium of claim 20 where:
 (y) said stored representation of said user's biometric identifier includes said user's pass code; and
 (z) said (d) includes logic instructions that, if executed, verify that said candidate pass code matches said user's pass code.

22. The computer-readable medium of claim 20 where said user's pass code was previously derived from said user's biometric identifier by logic instructions that, if executed:
 (x) represent said user's biometric identifier into one or more groups of characters; and
 (y) convert at least one of said groups into corresponding words in a human language.

23. The computer-readable medium of claim 20 where:
 (i) said stored representation of said user's biometric identifier includes a quantity into which said user's pass code can be converted;
 (ii) said user's pass code being convertible to said quantity via a conversion algorithm; and
 (iii) said (d) includes logic instructions that, if executed:
  (A) derive said quantity from said candidate pass code using said conversion algorithm; and
  (B) verify that said derived quantity matches said stored quantity.

24. The computer-readable medium of claim 20 where said user's pass code was previously derived from said user's biometric identifier user by logic instructions that, if executed:
 (x) convert said user's biometric identifier into one or more groups of numbers; and
 (y) interpret at least some of said groups into colors.

25. An authentication system for authenticating a user having a biometric authentication datum using a pass code serving as a substitute therefor, comprising:
 (a) means for receiving a candidate pass code (a1) presented on behalf of a user and (a2) purportedly corresponding to a pass code of said user;
  (i) said user's pass code being a substitute for a corresponding biometric identifier of said user;
  (ii) said user's pass code having been derived from said corresponding biometric identifier; and
  (iii) it being infeasible to rederive said biometric identifier from said user's pass code;
 (b) means for retrieving, from a memory accessible by said authentication system, a stored representation of said user's biometric identifier;
 (c) means for testing said candidate pass code against said representation of said user's biometric identifier; and
 (d) means for verifying said user's identity if said testing is successful.

26. The authentication system of claim 25 where said user's pass code was previously derived from said user's biometric identifier by:
 (x) means for representing said user's biometric identifier into one or more groups of characters; and
 (y) means for converting at least one of said groups into corresponding words in a human language.

27. The authentication system of claim 25 where said user's pass code was previously derived from said user's biometric identifier user by:
 (x) means for converting said user's biometric identifier into one or more groups of numbers; and
 (y) means for interpreting at least some of said groups into colors.

28. An authentication system for authenticating a user having a biometric authentication datum using a pass code serving as a substitute therefor, comprising:
 (a) an interface configured to receive a candidate pass code (a1) presented on behalf of a user and (a2) purportedly corresponding to a pass code of said user;
  (i) said user's pass code being a substitute for a corresponding biometric identifier of said user;
  (ii) said user's pass code having been derived from said corresponding biometric identifier; and
  (iii) it being infeasible to rederive said biometric identifier from said user's pass code;
 (b) a processor configured to:
  (i) retrieve from a memory a stored representation of said user's biometric identifier;
  (ii) compare said candidate pass code to said representation of said user's biometric identifier; and
  (iii) verify said user's identity if said candidate pass code matches said representation of said user's biometric identifier.

29. The authentication system of claim 28 where:
 (y) said stored representation of said user's biometric identifier includes said user's pass code; and
 (z) said processor is further configured to verify that said candidate pass code matches said user's pass code.

30. The authentication system of claim 28 where said user's pass code was previously derived from said user's biometric identifier by said processor further configured to:
 (x) represent said user's biometric identifier into one or more groups of characters; and
 (y) convert at least one of said groups into corresponding words in a human language.

31. The authentication system of claim 28 where:
 (i) said stored representation of said user's biometric identifier includes a quantity into which said user's pass code can be converted;
 (ii) said user's pass code being convertible to said quantity via a conversion algorithm; and
 (iii) said processor is further configured to:
  (A) derive said quantity from said candidate pass code using said conversion algorithm; and
  (B) verify that said derived quantity matches said stored quantity.

32. The authentication system of claim 28 where said user's pass code was previously derived from said user's biometric identifier user by said processor further configured to:
 (x) convert said user's biometric identifier into one or more groups of numbers; and
 (y) interpret at least some of said groups into colors.

33. A method for authenticating a user having a biometric authentication datum using a corresponding proxy datum, comprising:
(a) obtaining, at an authentication system, a candidate pass code purportedly presented on behalf of a user:
(i) said candidate pass code being either biometric or a proxy therefor;
(ii) said authentication system having access to at least two access indicia including:
(A) said user's biometric identifier; and
(B) said user's pass code;
(iii) each said pass code having been mathematically derived from a corresponding biometric identifier;
(A) it being infeasible to derive said corresponding biometric identifier from said pass code;
(b) retrieving, from a memory accessible by said authentication system, whichever of said user's access indicia in (ii) is similar in type to said candidate pass code;
(c) comparing said candidate pass code to said retrieved user's access indicia; and
(d) verifying said user's identity if said candidate pass code matches said retrieved user's access indicia.

34. The method of claim 33 where said user's pass code was previously derived from said user's biometric identifier by:
(x) representing said user's biometric identifier as one or more groups of characters; and
(y) converting at least some of said groups into corresponding real words.

35. The method of claim 33 where said user's pass code was previously derived from said user's biometric identifier by:
(x) converting said user's biometric identifier into one or more groups of numbers; and
(y) interpreting at least some of said groups into colors.

36. A computer-readable medium including logic instructions for authenticating a user having a biometric authentication datum using a corresponding proxy datum, said logic instructions that, if executed:
(a) receive, at an authentication system, a candidate pass code purportedly presented on behalf of a user:
(i) said candidate pass code being either biometric or a proxy therefor;
(ii) said authentication system having access to at least two access indicia including:
(A) said user's biometric identifier; and
(B) said user's pass code;
(iii) each said pass code having been mathematically derived from a corresponding biometric identifier;
(A) it being infeasible to derive said corresponding biometric identifier from said pass code;
(b) retrieve, from a memory accessible by said authentication system, whichever of said user's access indicia in (ii) is similar in type to said candidate pass code;
(c) test said candidate pass code against said retrieved user's access indicia; and
(d) verify said user's identity if said testing is successful.

37. The computer-readable medium of claim 36 where said user's pass code was previously derived from said user's biometric identifier by logic instructions that, if executed:
(x) represent said user's biometric identifier as one or more groups of characters; and
(y) convert at least some of said groups into corresponding real words.

38. The computer-readable medium of claim 36 where said user's pass code was previously derived from said user's biometric identifier by logic instructions that, if executed:
(x) convert said user's biometric identifier into one or more groups of numbers; and
(y) interpret at least some of said groups into colors.

39. An authentication system for authenticating a user having a biometric authentication datum using a corresponding proxy datum, comprising:
(a) means for receiving a candidate pass code purportedly presented on behalf of a user:
(i) said candidate pass code being either biometric or a proxy therefor;
(ii) said authentication system having access to at least two access indicia including:
(A) said user's biometric identifier; and
(B) said user's pass code;
(iii) each said pass code having been mathematically derived from a corresponding biometric identifier;
(A) it being infeasible to derive said corresponding biometric identifier from said pass code;
(b) means for retrieving from a memory whichever of said user's access indicia in (ii) is similar in type to said candidate pass code;
(c) means for testing said candidate pass code against said retrieved user's access indicia; and
(d) means for verifying said user's identity if said testing is successful.

40. The authentication system of claim 39 where said user's pass code was previously derived from said user's biometric identifier by:
(x) means for representing said user's biometric identifier as one or more groups of characters; and
(y) means for converting at least some of said groups into corresponding real words.

41. The authentication system of claim 39 where said user's pass code was previously derived from said user's biometric identifier by:
(x) means for converting said user's biometric identifier into one or more groups of numbers; and
(y) means for interpreting at least some of said groups into colors.

42. An authentication system for authenticating a user having a biometric authentication datum using a corresponding proxy datum, comprising:
(a) an interface configured to receive a candidate pass code purportedly presented on behalf of a user:
(i) said candidate pass code being either biometric or a proxy therefor;
(ii) said authentication system having access to access indicia including:
(A) said user's biometric identifier; and
(B) said user's pass code;
(iii) each said pass code having been mathematically derived from a corresponding biometric identifier;
(A) it being infeasible to derive said corresponding biometric identifier from said pass code;
(b) a processor configured to:
(i) retrieve from a memory whichever of said user's access indicia in (ii) is similar in type to said candidate pass code;
(ii) compare said candidate pass code to said retrieved user's access indicia; and
(iii) verify said user's identity if said candidate pass code matches said retrieved user's access indicia.

43. The authentication system of claim 42 where said user's pass code was previously derived from said user's biometric identifier by said processor further configured to:
 (x) represent said user's biometric identifier as one or more groups of characters; and
 (y) convert at least some of said groups into corresponding real words.

44. The authentication system of claim 42 where said user's pass code was previously derived from said user's biometric identifier by said processor further configured to:
 (x) convert said user's biometric identifier into one or more groups of numbers; and
 (y) interpret at least some of said groups into colors.

* * * * *